(12) United States Patent
Oken et al.

(10) Patent No.: US 10,292,237 B2
(45) Date of Patent: May 14, 2019

(54) HIGH EFFICIENCY LIGHT SYSTEM

(71) Applicant: Yehi Or Light Creation Limited, Raanana (IL)

(72) Inventors: Alan Oken, Raanana (IL); Itzhak Katz, Kfar Saba (IL); Avraham Emanuel, Johannesburg (ZA)

(73) Assignee: YEHI OR LIGHT CREATION LIMITED (IL)

( * ) Notice: Subject to any disclaimer, the term of this patent is extended or adjusted under 35 U.S.C. 154(b) by 0 days.

(21) Appl. No.: 15/636,759

(22) Filed: Jun. 29, 2017

(65) Prior Publication Data
US 2018/0007762 A1    Jan. 4, 2018

Related U.S. Application Data

(60) Provisional application No. 62/356,820, filed on Jun. 30, 2016.

(51) Int. Cl.
*F21V 7/04* (2006.01)
*H05B 37/02* (2006.01)
(Continued)

(52) U.S. Cl.
CPC ........... *H05B 37/0209* (2013.01); *B41M 5/46* (2013.01); *C03C 17/004* (2013.01); *F21V 7/0008* (2013.01); *F21V 7/0025* (2013.01); *F21V 9/30* (2018.02); *F21V 29/83* (2015.01); *H05B 35/00* (2013.01)

(58) Field of Classification Search
CPC .... G02B 6/0006; G02B 5/282; G02B 6/0008; G02B 5/0833; G02B 5/0858; G02B 5/281; G02B 5/283; G02B 5/285; G02B 6/10; F21V 13/02; F21V 2200/20; F21V 23/0442; F21V 2200/30; F21V 2200/40
(Continued)

(56) References Cited

U.S. PATENT DOCUMENTS 4,754,373 A * 6/1988 Otto ........................ F21S 41/00
                                                      362/547
5,646,050 A * 7/1997 Li ...................... H01L 31/03767
                                                      136/258
(Continued)

OTHER PUBLICATIONS

International Search Report from related PCT Application No. PCT/IB2017/053927, dated Oct. 12, 2017.

*Primary Examiner* — Thien M Le
(74) *Attorney, Agent, or Firm* — Edell, Shapiro & Finnan, LLC

(57) ABSTRACT

An innovative and highly efficient light system is disclosed herein. The light system includes a housing with an inner shroud and an outer shroud, a first light source and a second light source. The inner shroud is disposed within the outer shroud, and both light sources are disposed within the inner shroud. The second light source may produce light and heat. The heat from the second light source may be absorbed by the first light source to enable the first light source to more efficiently produce light. The light system may provide light from both the first light source and the second light source simultaneously. The inner surface of the outer shroud may contain an infrared reflective coating configured to retain the heat produced from the second light source within the housing while still enabling the output of the visible light produced by the first and second light sources.

20 Claims, 6 Drawing Sheets

(51) Int. Cl.
*F21V 29/83* (2015.01)
*F21V 9/30* (2018.01)
*B41M 5/46* (2006.01)
*C03C 17/00* (2006.01)
*F21V 7/00* (2006.01)
*H05B 35/00* (2006.01)

(58) Field of Classification Search
USPC .......................................................... 362/618
See application file for complete search history.

(56) References Cited

U.S. PATENT DOCUMENTS

| | | | |
|---|---|---|---|
| 5,949,180 A | 9/1999 | Walker | |
| 6,605,888 B1 | 8/2003 | Waymouth et al. | |
| 6,670,763 B2 | 12/2003 | Golz et al. | |
| 6,991,350 B2 | 1/2006 | McInnis | |
| 2004/0057250 A1* | 3/2004 | Roberts | F21V 9/04 362/554 |
| 2006/0226777 A1* | 10/2006 | Cunningham | C03C 17/005 313/580 |
| 2007/0132397 A1 | 6/2007 | Koenigsberg et al. | |
| 2008/0049428 A1* | 2/2008 | Cunningham | H01K 1/325 362/293 |
| 2008/0054812 A1 | 3/2008 | Brock et al. | |
| 2009/0273922 A1 | 11/2009 | Ho et al. | |
| 2011/0265853 A1* | 11/2011 | Tjards | H02S 10/30 136/246 |
| 2015/0103398 A1* | 4/2015 | Banerjee | G02B 5/281 359/360 |

\* cited by examiner

HIGH EFFICIENCY LIGHT SYSTEM

CROSS REFERENCE TO RELATED APPLICATIONS

This application claims priority to and the benefit of U.S. Provisional Patent Application No. 62/356,820, filed Jun. 30, 2016, entitled "High Efficiency Light System," the contents of which are hereby incorporated by reference in their entirety.

FIELD OF THE INVENTION

Present invention embodiments relate to a light system (e.g., for flood lamps, road lighting, ware-houses, etc.) that utilizes one or more different types of light sources simultaneously. In particular, the light system disclosed herein contains a specially made metal halide type light source (LS) and a sodium vapor type light source (LS) positioned within a shroud, where the heat loss from the metal halide LS is used in such a way, that the resultant overall efficiency of the system is very high.

This new technology is termed HLC (Heat to Light Conversion).

BACKGROUND

Many light systems (street lighting systems, flood lighting systems of parking lots, flood lighting systems around buildings, etc.) utilize sodium-vapor lamps.

Sodium-vapor lamps are gas-discharge lamps which create an electrical arc to cause the gas to ionize. Typically sodium-vapor lamps contain a mixture of noble gases (e.g., Neon and Argon). Free electrons, which are the result of the ionization of the gas, collide with the sodium vapor atoms to create yellow light. Low pressure sodium-vapor lamps produce nearly monochromatic yellow light, which is beneficial for reducing light pollution, limiting lighting effects on the environment (for both flora and fauna), and allows for an easier adaption of human eyes to varying light levels. Typical luminous efficiency is 150 lumens per watt.

Metal-halide lamps are typically utilized for wide area overhead lighting situations (e.g., commercial, industrial, and public spaces, such as parking lots, sports arenas, factories, and retail stores) as well as for automotive headlamps. Similar to sodium-vapor lamps, metal-halide lamps are also gas-discharge lamps, but metal-halide lamps produce a substantially white light by creating an electric arc through a gaseous mixture of vaporized mercury and metal halides (compounds of metals with bromine or iodine). As a result, metal-halide lamps have a luminous efficiency of around 75 to 100 lumens per watt. While metal-halide lamps may be used for outdoor light sources, the white light produced by metal-halide lamps create a larger amount of light pollution than that of sodium-vapor lamps. In addition, the human eye takes a longer amount of time to adapt to varying light levels lit by the white light of metal-halide lamps than that of the yellow light of sodium-vapor lamps. Approximately 25% of the energy consumed by the metal-halide lamps is used to produce light, while the remaining 75% of the consumed energy is converted to heat.

Most Gas-discharge lamps, and more specifically, metal-vapor based lamps, require a high amount of energy in the form of heat in order to operate. The heat is used to keep the metal particles in their vapor state, and thus, the high temperature must be maintained within the housing of the lamp in order to keep the metal particles in their vapor state.

The present invention embodiment is directed generally to a light system that utilizes both a sodium-vapor LS (first LS) and a metal-halide LS (second LS) to create a light system technology that is more efficient than conventional light source technologies. The present invention embodiment may contain a luminous efficiency of up to 300 lumens per watt. The present invention embodiment utilizes the heat loss of the second LS to increase the efficiency of the first LS in a light system that outputs combined yellow and white lights. In addition, the present invention embodiment may include at least one shroud surrounding the first LS and second LS, whereas at least one shroud contains an infrared (IR) coating to retain the required high temperature within the shroud by reflecting IR radiation back into the shroud.

SUMMARY

According to one exemplary embodiment, the present invention includes a light system that utilizes the heat output of at least one light source to more efficiently produce light from at least one other light source as shown and described herein.

According to a second embodiment, the present invention includes an apparatus containing a housing, a first light source, and a second light source. The housing may contain at least an inner shroud and an outer shroud. The inner shroud may be concentrically disposed within the outer shroud. Both the first light source and the second light source may be disposed within the inner shroud. The first light source may be a sodium-vapor LS. The second light source may be a metal-halide LS that outputs both light and heat. The heat from the second light source may be absorbed from the first light source to heat and convert the solid metal particles of the first light source into a vapor. The free electrons of the first light source collide with the vapor atoms to emit light from the first light source. Thus, the light system may provide light from both the first light source and the second light source simultaneously. The inner surface of the outer shroud may contain a reflective coating configured to retain the heat produced from the second light source within the housing while still enabling the output of the visible light produced by the first and second light sources.

According to third embodiment, the present invention includes an apparatus containing a housing and a single light source. The housing may contain at least an inner shroud and an outer shroud. The inner shroud may be concentrically disposed within the outer shroud. The light source may be disposed within the inner shroud. The light source may be a sodium-vapor type of light source that outputs both light and heat. The heat from the light source may be contained within the inner shroud and absorbed by the light source itself to heat and convert the solid metal particles of the light source into a vapor. The free electrons of the light source collide with the vapor atoms to emit light from the light source. Thus, the light system may provide light from the light source.

At least one surface of the shrouds may contain a reflective coating configured to retain the heat produced from the light source within the housing while still enabling the output of the visible light produced by the light source.

According to a fourth embodiment, the present invention includes, similar to the second embodiment, an apparatus containing a housing, a first light source, and a second light source. However, unlike the second embodiment, the housing may contain only a single shroud. Both the first light source and the second light source may be disposed within the shroud. The first light source may be a sodium-vapor LS.

The second light source may be a metal-halide LS that outputs both light and heat. The heat from the second light source may be absorbed from the first light source to heat and convert the solid metal particles of the first light source into a vapor. The free electrons of the first light source collide with the vapor atoms to emit light from the first light source. Thus, the light system may provide light from both the first light source and the second light source simultaneously. The inner surface of the shroud may contain a reflective coating configured to retain the heat produced from the second light source within the housing while still enabling the output of the visible light produced by the first and second light sources.

According to a fifth embodiment, the present invention includes an apparatus containing a housing and a single light source. Similar to the fourth embodiment, the housing only contains a single shroud, where the light source may be disposed within the single shroud. The light source may be a sodium-vapor type of light source that outputs both light and heat. The heat from the light source may be contained within the single shroud and absorbed by the light source itself to heat and convert the solid metal particles of the light source into a vapor. The free electrons of the light source collide with the vapor atoms to emit light from the light source. Thus, the light system may provide light from the single light source. In this embodiment, both the light source and the single shroud may contain a reflective coating configured to retain the heat produced from the single light source within the housing, and ultimately the single light source, while still enabling the output of the visible light produced by the single light source.

BRIEF DESCRIPTION OF THE DRAWINGS

Like reference numerals have been used to identify like elements throughout this disclosure.

DETAILED DESCRIPTION OF THE INVENTION

Figure 1:
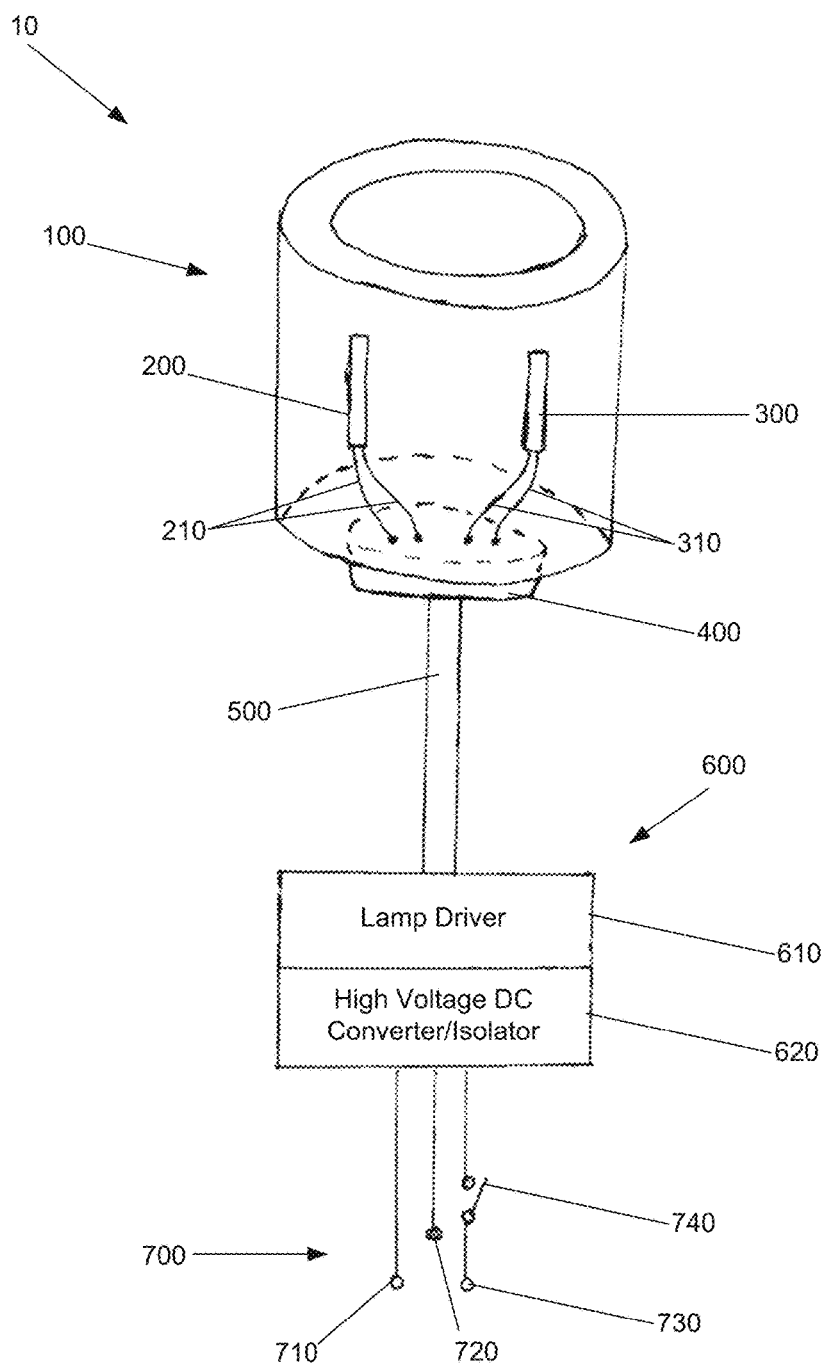
FIG. 1 illustrates a schematic diagram of an outdoor light system according to an embodiment of the present invention.

As illustrated in FIG. 1, a light system 10, or outdoor light system, includes a housing 100 enclosing a first light source 200 and a second light source 300. The light system 10 further includes a connector 400, a loom of wires 500, a ballast 600, and the mains electricity or mains power 700. As illustrated, the connector 400 is coupled to the bottom of the housing 100 and the first and second light sources 200, 300 disposed within the housing 100. The connector 400 may be any type of connector to enable the light system 10 to operate with existing light fittings, provided the fitting can supply the desired power. The connector 400 may also create an airtight seal with the housing 100, while allowing the wires 210 of the first light source 200 and the wires 310 of the second light source 300 to exit the housing 100. While FIG. 1 illustrates the loom of wires 500 and the ballast 600 disposed outside of the connector 400, in another embodiment, the loom of wires 500 and the ballast 600 may be disposed or housed within the connector 400. The loom of wires 500 extending between the connector 400 and the ballast 600 delivers the wires 210 of the first light source 200 and the wires 310 of the second light source 300 to the ballast 600.

As illustrated in FIG. 1, the ballast 600 includes control components that are connected to AC mains power 700 to deliver power from the mains power 700 to the first and second light sources 200, 300. The ballast 600 includes a lamp driver 610 and a high voltage DC converter/isolator 620. The lamp driver 610 may be an electrical device that regulates the power that is delivered to the first and second light sources 200, 300. The lamp driver 610 may respond to the changing needs of the first and second light sources 200, 300 by providing a constant quantity of power to the first and second light sources 200, 300 as their electrical properties change with temperature and pressure. The high voltage DC converter 620 is used to operate the driver 610. The driver 610 in turn supplies a suitable AC power to both light sources 200, 300.

As further illustrated in FIG. 1, the mains power 700 is coupled to the ballast 600. In another embodiment, where the ballast 600 is disposed or housed within the connector 400, the mains power 700 would be operatively connected to the connector 400 to deliver AC power to the light system 10 from any AC power source (e.g., wall outlet, etc.). The mains power 700 may include a negative terminal 710, a ground terminal 720, and a positive terminal 730. The positive terminal 730 may be further equipped with a switch 740 that regulates whether or not power is delivered from the mains power 700 to the ballast 600, and, ultimately, the first and second light sources 200, 300.

Figure 2:
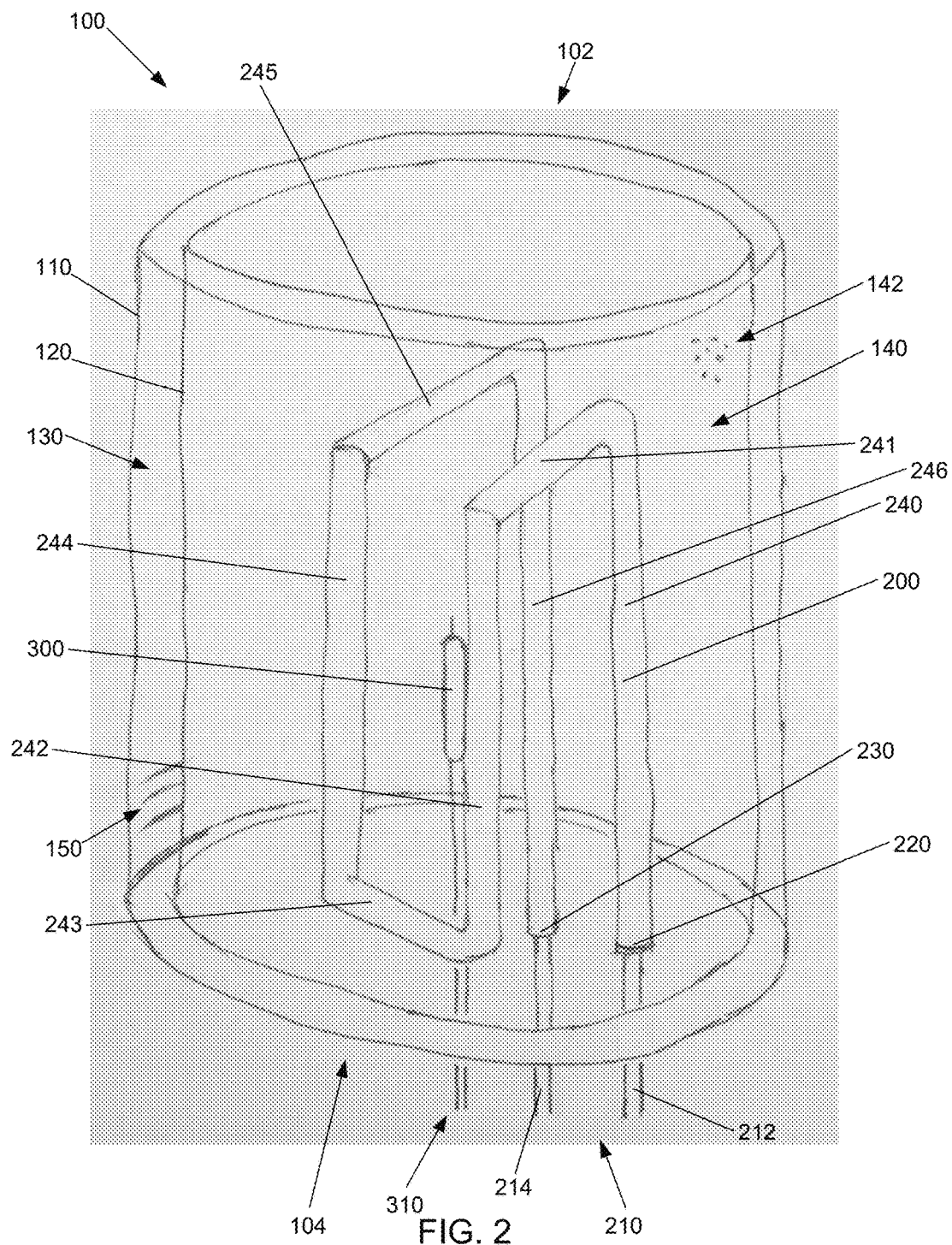
FIG. 2 illustrates a perspective view of a first embodiment of the housing of the embodiment of the outdoor light system illustrated in FIG. 1.

Turning to FIG. 2, illustrated is a detailed perspective view of the housing 100 of the light system 10. The housing 100 includes a first end 102 and a second end 104 opposite the first end 102. The housing 100 further includes an outer container or shroud 110 and an inner container or shroud 120. The inner shroud 120 may be smaller in size and volume than the outer shroud 110, and the inner shroud 120 may be fully disposed within the outer shroud 110. Thus, the outer shroud 110 fully encases the inner shroud 120. The inner shroud 120 may be disposed within the outer shroud 110 such that the outer shroud 110 and the inner shroud 120 are concentrically aligned. As illustrated in FIG. 2, a cavity 130 is disposed between the inner surface of the outer shroud 110 and the outer surface of the inner shroud 120. The distance between the inner surface of the outer shroud 110 and the outer surface of the inner shroud 120 may be approximately 3 millimeters. In other embodiments, the distance between the inner wall of the outer shroud 110 and the outer wall of the inner shroud 120 may be larger or smaller than 3 millimeters. This cavity 130 may contain a high vacuum (pressure in the range from 100 millipascal (mPa) to 100 nanopascal (nPa)). Furthermore, the shrouds 110, 120, while illustrated as substantially cylindrical, may be in any desired shape (e.g., rectangular, elliptical, spherical, etc.). However, cylindrical and elliptical shaped shrouds 110, 120 may enhance the radiation and heating effect of the second light source 300 on the first light source 200.

As illustrated in FIG. 2, the inner shroud 120 defines an interior region 140 that contains or houses the first light source 200 and the second light source 300. Thus, the first light source 200 and the second light source 300 are disposed within the interior region 140 of the inner shroud 120. Furthermore, the inner shroud 120 may also store or retain an inert or non inert gas 142, or a mixture of gases. The gas 142 may be a noble gas (e.g., helium, neon, argon, krypton, xenon), or a mixture of noble gases 142. The stored gas 142 may be retained within the interior region 140 of the inner shroud 120 at a pressure between 0 and 760 Torr. The gas 142 aids in the transfer of heat, by conduction, from the second light source 300 to the first light source 200. The inert gas 142 also serves to evenly distribute the heat generated by the second light source 300 throughout the interior region 140 of the inner shroud 120.

As previously explained, the housing 100 includes a first light source 200 and a second light source 300 disposed within the interior region 140 defined by the inner shroud 120. The first light source 200 may be a sodium-vapor type LS that produces light with a yellow hue or color. The first light source 200 may produce light with a virtually monochromatic light averaging approximately 589 nanometers (nm) in wavelength. The first light source 200 is tubular with a first end 220 and a second end 230. Furthermore, the first light source 200 contains seven tubular sections 240, 241, 242, 243, 244, 245, 246 that enable the first light source 200 to curve and bend around the interior region 140 of the inner shroud 120 between the first end 220 and the second end 230. As illustrated, the tubular sections 240, 241, 242, 243, 244, 245, 246 create several U-shaped portions of the first light source 200, where the U-shaped portions bend around the interior region 140 of the inner shroud 120. In other embodiments, the first light source 200 may contain any number of tubular sections. In addition, the first light source 200 may be of any desired shape, and may be formed of only a single linear tube or a single U-shaped tube. In even other embodiments of the light system 10, the first light source 200 may be any type of light source, and is not limited to only sodium-vapor types of light sources. While FIGS. 1 and 2 illustrated two light sources 200, 300, the light system 10 may include more than two light sources disposed within the housing 100.

As further illustrated, extending from the first and second ends 220, 230 are wires 210. Wires 210 include a first set of wires 212 extending downwardly from the first end 220 of the first light source 200 and a second set of wires 214 extending downwardly from the second end 230 of the first light source 200. The first and second sets of wires 212, 214 may extend through the second end 104 of the housing 100 and through connector 400 (illustrated in FIG. 1). The first set of wires 212 may supply power to filaments, or electrodes, (not shown) disposed within the first tubular section 240 proximate to the first end 220 of the first light source 200. The second set of wires 214 may supply power to filaments, or electrodes, (not shown) disposed within the seventh tubular section 246 proximate to the second end 230 of the first light source 200. The first and second sets of wires 212, 214 also support the first light source 200 within the interior region 140.

The light source 200 also contains sodium particles mixed with a noble gas (e.g., neon, argon, etc.). The noble gas disposed within the first light source 200 may be disposed within the first light source 200 at a pressure of up to 8 Torr, which is less than that of conventional sodium-vapor lamps.

An electric arc is created between the two filaments of the first light source 200, and free electrons, accelerated by the electric arc in the tube, collide with the gas atoms to produce visible light.

Continuing with FIG. 2, the second light source 300 may be any type of light source, including, but not limited to, a metal-halide lamp that produces light with a white hue or color. The second light source 300 may be disposed centrally within the interior region 140 of the inner shroud 120. As illustrated the first light source 200 curves and bends around the second light source 300. The second light source 300 includes a set of wires 310 that extend downwardly from the second light source 300 through the second end 104 of the housing 100 and through the connector 400 (illustrated in FIG. 1). The set of wires 310 deliver power to the second light source 300 and also support the positioning of the second light source 300 within the interior region 140 of the inner shroud 120. When the second light source 300 is a metal halide lamp, the second light source 300 may operate by creating an electric arc through a gaseous mixture of vaporized mercury and metal halides (compounds of metals with bromine or iodine). Approximately 25% of the energy consumed by the second light source 300 is used to produce light, while the remaining 75% of the energy consumed is converted to heat.

Both the first light source 200 and the second light source 300 are operable at the same time to simultaneously produce light from the light system 10. When the light system 10 includes first and second light sources 200, 300 as described above, the light system 10 simultaneously produces a yellow light from the first light source 200 and a white light from the second light source 300. Other embodiments of the light system 10 may be configured to produce other colors of light depending on the type of light source of the first and second light sources 200, 300. By positioning the first and second light sources 200, 300 within the same inner shroud 120, and by curving the first light source 200 around the second light source 300, the heat generated by the second light source 300 is absorbed by the first light source 200. The absorbed heat aids the first light source 200 in converting the solid metal particles (i.e., sodium for the present invention embodiment) into their vapor form, enabling the first light source 200 to use less electricity to perform this conversion. In addition, the absorbed heat also aids the first light source 200 in maintaining its operating temperature, which also enables the first light source 200 to use less electricity when outputting light.

FIG. 2 further illustrates a coating 150 on the inner surface of the outer shroud 110. The coating 150 may be an infrared (IR) coating configured to reflect IR light waves back into the interior region 140 of the inner shroud 120. Thus, the coating 150 is configured to reflect and retain the heat that develops from the light sources 200, 300 within the interior region 140 of inner shroud 120. The coating 150 not only provides insulation to the housing 100, it also allows the visible light waves (approximately 400-700 nm) to travel out of the inner and outer shrouds 110, 120. Another embodiment of the light system 10 may contain a coating on the outer surface of the outer shroud 110, the outer surface of the inner shroud 120, and/or the inner surface of the inner shroud 120. In another embodiment where the light system 10 contains more than two shrouds, the IR coating 150 may be on any surface (e.g., inner surface and/or outer surface) of any of the shrouds of the light system 10.

Figure 3:
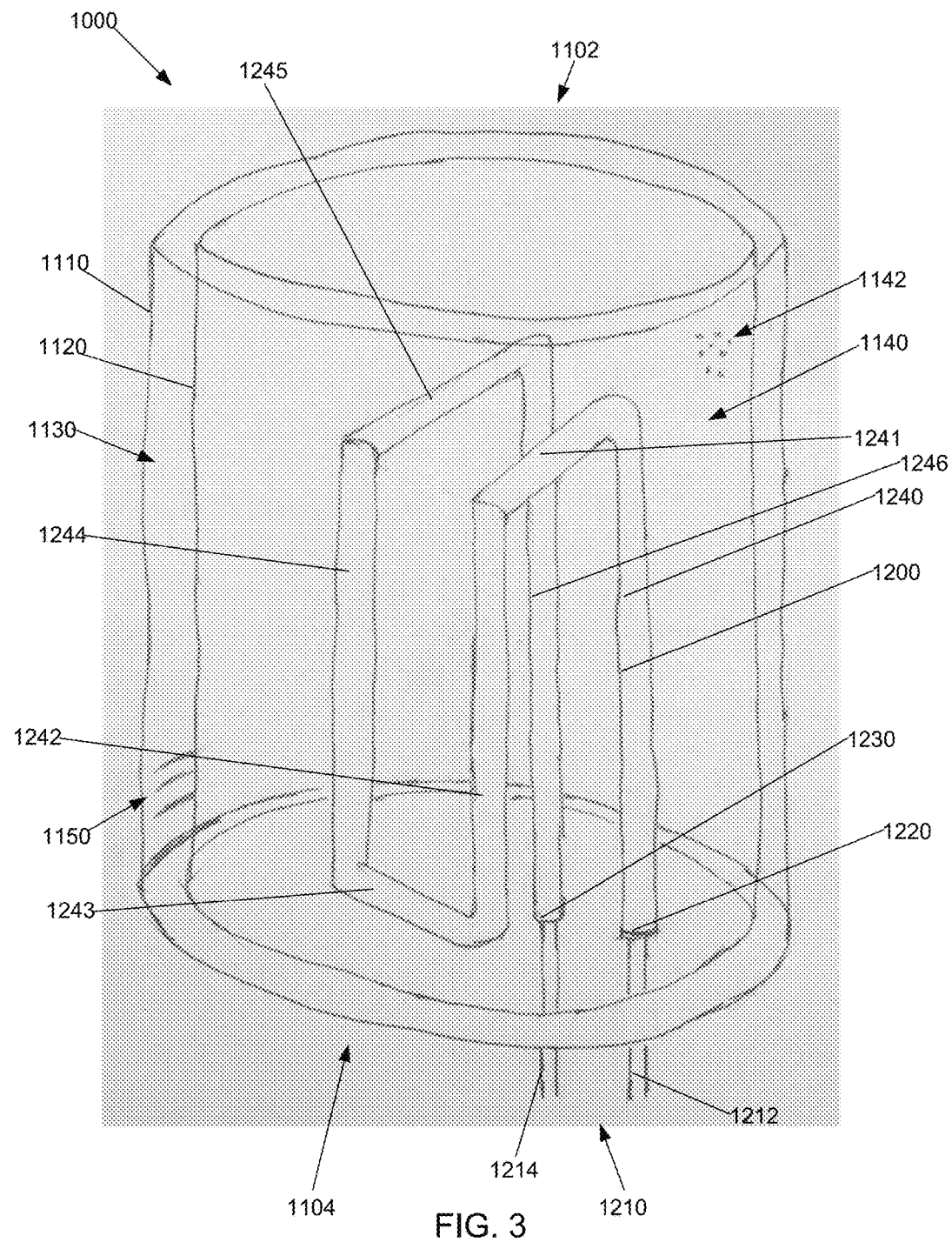
FIG. 3 illustrates a perspective view of a second embodiment of the housing of the embodiment of the outdoor light system illustrated in FIG. 1.

Turning to FIG. 3, illustrated is a detailed perspective view of a second embodiment of the housing 1000 of the light system 10. Similar to the first embodiment, the second embodiment of the housing 1000 includes a first end 1102 and a second end 1104 opposite the first end 1102. The housing 1000 further includes an outer container or shroud 1110 and an inner container or shroud 1120. The inner shroud 1120 may be smaller in size and volume than the outer shroud 1110, and the inner shroud 1120 may be fully disposed within the outer shroud 1110. Thus, the outer shroud 1110 fully encases the inner shroud 1120. The inner shroud 1120 may be disposed within the outer shroud 1110 such that the outer shroud 1110 and the inner shroud 1120 are concentrically aligned. The second embodiment of the housing 1000 further includes a cavity 1130 that is disposed between the inner surface of the outer shroud 1110 and the outer surface of the inner shroud 1120. The distance between the inner surface of the outer shroud 1110 and the outer surface of the inner shroud 1120 may be approximately 3 millimeters. In other embodiments, the distance between the inner wall of the outer shroud 1110 and the outer wall of the inner shroud 1120 may be larger or smaller than 3 millimeters. This cavity 1130 may contain a high vacuum (pressure in the range from 100 millipascal (mPa) to 100 nanopascal (nPa)).

In even other embodiments of the housing 100, 1000, the housing may contain more than two shrouds. In other words, other embodiments of the housing 100, 1000 may include an innermost shroud, an outermost shroud, and any number of intermediate shrouds surrounding the innermost shroud and being surrounded by the outermost shroud. Each of these multiple shrouds may be separated by any distance, as previously described.

As further illustrated in FIG. 3, and similar to the first embodiment, the inner shroud 1120 defines an interior region 1140. However, unlike the first embodiment, the interior region 1140 of the inner shroud 1120 contains or houses a single light source 1200. The inner shroud 1120 may also store or retain an inert or non-inert gas 1142, or a mixture of gases. The gas 1142 may be a noble gas (e.g., helium, neon, argon, krypton, xenon), a mixture of noble gases 1142, or may contain no gas (i.e., a vacuum). The stored gas 1142 may be retained within the interior region 1140 of the inner shroud 1120 at a pressure of between 0 and 760 Torr. Both the inert gas 1142 and the vacuum serve to evenly distribute the heat generated by the light source 1200 throughout the interior region 1140 of the inner shroud 1120.

As previously explained, the second embodiment of the housing 1000 includes a single light source 1200 disposed within the interior region 1140 defined by the inner shroud 1120. The light source 1200 may be a sodium-vapor type LS that produces light with a yellow hue or color. The light source 1200 may produce light with a virtually monochromatic light averaging approximately 589 nanometers (nm) in wavelength. Similar to the first light source 200 of the first embodiment, the light source 1200 is tubular with a first end 1220 and a second end 1230. Furthermore, the light source 1200 contains seven tubular sections 1240, 1241, 1242, 1243, 1244, 1245, 1246 that enable the light source 1200 to curve and bend around the interior region 1140 of the inner shroud 1120 between the first end 1220 and the second end 1230. As illustrated, and similar to the first light source 200 of the first embodiment, the tubular sections 1240, 1241, 1242, 1243, 1244, 1245, 1246 create several U-shaped portions of the light source 1200, where the U-shaped portions bend around the interior region 1140 of the inner shroud 1120. In other embodiments, the light source 1200 may contain any number of tubular sections. In addition, the light source 1200 may be of any desired shape, and may be formed of only a single linear tube or a single U-shaped tube.

In even other embodiments of the light system 10, the light source 1200 may be any light source, and is not limited to a sodium-vapor type of light source.

As further illustrated and similar to the first light source 200 of the first embodiment, extending from the first and second ends 1220, 1230 are wires 1210. Wires 1210 include a first set of wires 1212 extending downwardly from the first end 1220 of the light source 1200 and a second set of wires 1214 extending downwardly from the second end 1230 of the light source 1200. The first and second sets of wires 1212, 1214 may extend through the second end 1104 of the housing 1000 and through connector 400 (illustrated in FIG. 1). The first set of wires 1212 may supply power to filaments, or electrodes, (not shown) disposed within the first tubular section 1240 proximate to the first end 1220 of the light source 1200. The second set of wires 1214 may supply power to filaments, or electrodes, (not shown) disposed within the seventh tubular section 1246 proximate to the second end 1230 of the light source 1200. The first and second sets of wires 1212, 1214 also support the light source 1200 within the interior region 1140.

Also similar to the first light source 200 of the first embodiment, the light source 1200 also contains sodium particles mixed with a noble gas (e.g., neon, argon, etc.). The noble gas disposed within the light source 1200 may be disposed within the light source 1200 at a pressure of up to 8 Torr, which is less than that of conventional sodium-vapor lamps. An electric arc is created between the two filaments of the light source 1200, and free electrons, accelerated by the electric arc in the tube, collide with the gas atoms to produce visible light.

When the light system 10 includes only light source 1200, as described above, the light system 10 may outputs a yellow light, as compared to the yellow and white light output by the first embodiment of the housing 1000. The yellow light output by the light system 10 is produced from the light source 1200. By positioning the light source 1200 so that it curves around the interior region 1140, which is in a vacuum, the heat generated by the light source 1200 is dispersed and retained within the interior region 1140 so that the heat may be absorbed by the light source 1200. The absorbed heat aids the light source 1200 in converting the solid metal particles (i.e., sodium for the present invention embodiment) into their vapor form, enabling the light source 1200 to use less electricity to perform this conversion when compared to the light source 1200 being disposed out of the interior region 1140. In addition, the absorbed heat also aids the light source 1200 in maintaining its operating temperature, which also enables the light source 1200 to use less electricity when outputting light.

Similar to the first embodiment, as illustrated in FIG. 3, a coating 1150 is disposed on the inner surface of the outer shroud 1110. The coating 1150 may be an infrared (IR) coating configured to reflect IR light waves back into the interior region 1140 of the inner shroud 1120. Thus, the coating 1150 is configured to reflect and retain the heat that develops from the light source 1200 within the interior region 1140 of inner shroud 1120. The coating 1150 not only provides insulation to the housing 1000, it also allows the visible light waves (approximately 400-700 nm) to travel out of the inner and outer shrouds 1110, 1120. The coating 1150 may be disposed on any surface of either the outer and/or inner shrouds 1110, 1120. Again, in other embodiments of the light system 10 where the light system 10 contains more than two shrouds, the IR coating 1150 may be on any surface (e.g., inner surface and/or outer surface) of any of the shrouds of the light system 10.

Figure 4:
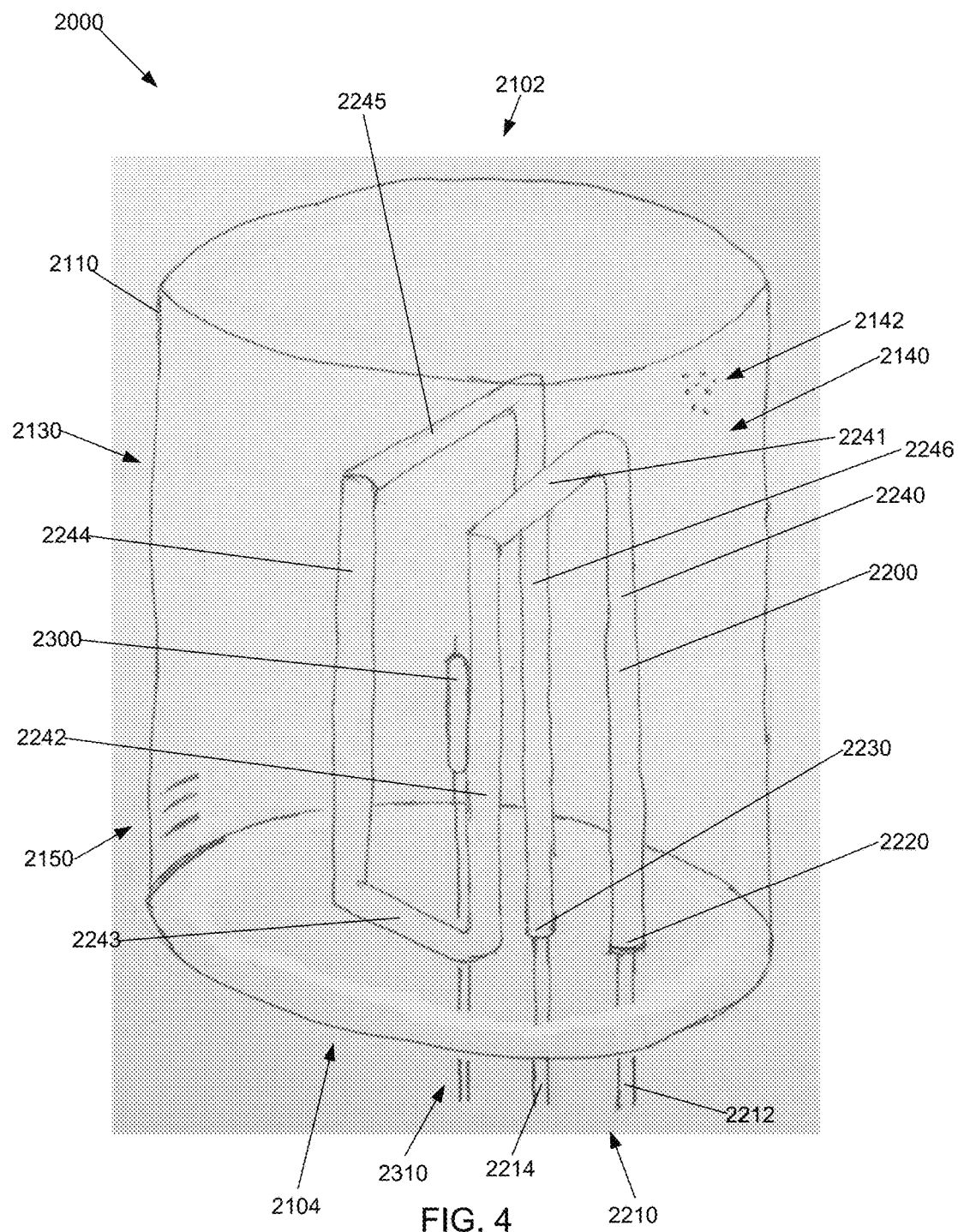
FIG. 4 illustrates a perspective view of a third embodiment of the housing of the embodiment of the outdoor light system illustrated in FIG. 1.

Turning to FIG. 4, illustrated is a detailed perspective view of the housing 2000 of the light system 10 according to an example embodiment. Similar to the previous two example embodiments of the housing 100, 1000 discussed, the housing 2000 includes a first end 2102 and a second end 2104 opposite the first end 2102. Unlike the previous two example embodiments of the housing 100, 1000, however, the housing 2000 includes a single container or shroud 2110. Furthermore, while illustrated as substantially cylindrical, the shroud 2110 may be in any desired shape (e.g., rectangular, elliptical, spherical, etc.). However, cylindrical and elliptical shaped shrouds 2110 may enhance the radiation and heating effect of the second light source 2300 on the first light source 2200.

As illustrated in FIG. 4, the shroud 2110 defines an interior region 2140 that contains or houses the first light source 2200 and the second light source 2300. Thus, the first light source 2200 and the second light source 2300 are disposed within the interior region 2140 of the shroud 2110. Furthermore, the shroud 2110 may also store or retain an inert or non-inert gas 2142, or a mixture of gases. The gas 2142 may be a noble gas (e.g., helium, neon, argon, krypton, xenon), or a mixture of noble gases 2142. The stored gas 2142 may be retained within the interior region 2140 of the shroud 2110 at a pressure between 0 and 760 Torr. The gas 2142 aids in the transfer of heat, by conduction, from the second light source 2300 to the first light source 2200. The inert gas 2142 also serves to evenly distribute the heat generated by the second light source 2300 throughout the interior region 2140 of the shroud 2110.

As previously explained, and similar to that of the first example embodiment of the housing 100, the housing 2000 includes a first light source 2200 and a second light source 2300 disposed within the interior region 2140 defined by the shroud 2110. The first light source 2200 may be a sodium-vapor type LS that produces light with a yellow hue or color. The first light source 2200 may produce light with a virtually monochromatic light averaging approximately 589 nanometers (nm) in wavelength. As similarly described with respect to the first light source 200 disposed within the first example embodiment of the housing 100, the first light source 2200 is tubular with a first end 2220 and a second end 2230. The first light source 2200 contains seven tubular sections 2240, 2241, 2242, 2243, 2244, 2245, 2246 that enable the first light source 2200 to curve and bend around the interior region 2140 of the shroud 2110 between the first end 2220 and the second end 2230 of the first light source 2200. As illustrated, the tubular sections 2240, 2241, 2242, 2243, 2244, 2245, 2246 create several U-shaped portions of the first light source 2200, where the U-shaped portions bend around the interior region 2140 of the shroud 2110. In other embodiments, the first light source 2200 may contain any number of tubular sections. In addition, the first light source 2200 may be of any desired shape, and may be formed of only a single linear tube or a single U-shaped tube. In even other embodiments of the light system 10, as previously explained, the first light source 2200 may be any type of light source, and is not limited to only sodium-vapor types of light sources. While FIG. 3 illustrates two light sources 200, 300, the light system 10 may include more or less than two light sources disposed within the housing 2000.

As further illustrated, and similar to that illustrated in FIG. 2 for the first example embodiment of the housing 100, extending from the first and second ends 2220, 2230 are wires 2210. Wires 2210 include a first set of wires 2212 extending downwardly from the first end 2220 of the first light source 2200 and a second set of wires 2214 extending downwardly from the second end 2230 of the first light source 2200. The first and second sets of wires 2212, 2214 may extend through the second end 2104 of the housing 2000 and through connector 400 (illustrated in FIG. 1). The first set of wires 2212 may supply power to filaments, or electrodes, (not shown) disposed within the first tubular section 2240 proximate to the first end 2220 of the first light source 2200. The second set of wires 2214 may supply power to filaments, or electrodes, (not shown) disposed within the seventh tubular section 2246 proximate to the second end 2230 of the first light source 2200. The first and second sets of wires 2212, 2214 also support the first light source 2200 within the interior region 2140.

The light source 2200, like that of light source 200 of the first example embodiment, may contain sodium particles mixed with a noble gas (e.g., neon, argon, etc.). The noble gas disposed within the first light source 2200 may be disposed within the first light source 2200 at a pressure of up to 8 Torr, which is less than that of conventional sodium-vapor lamps. An electric arc is created between the two filaments of the first light source 2200, and free electrons, accelerated by the electric arc in the tube, collide with the gas atoms to produce visible light.

Continuing with FIG. 4, the second light source 2300 may be any type of light source, including, but not limited to, a metal-halide lamp that produces light with a white hue or color. Similar to the first example embodiment of the housing 100, the second light source 2300 may be disposed centrally within the interior region 2140 of the shroud 2110. As illustrated the first light source 2200 curves and bends around the second light source 2300. The second light source 2300 includes a set of wires 2310 that extend downwardly from the second light source 2300 through the second end 2104 of the housing 2000 and through the connector 400 (illustrated in FIG. 1). The set of wires 2310 deliver power to the second light source 2300 and also support the positioning of the second light source 2300 within the interior region 2140 of the shroud 2110. When the second light source 2300 is a metal halide lamp, the second light source 2300 may operate by creating an electric arc through a gaseous mixture of vaporized mercury and metal halides (compounds of metals with bromine or iodine). Approximately 25% of the energy consumed by the second light source 2300 is used to produce light, while the remaining 75% of the energy consumed is converted to heat.

Similar to the first example embodiment of the housing 100, both the first light source 2200 and the second light source 2300 are operable at the same time to simultaneously produce light from the light system 10. When the light system 10 includes first and second light sources 2200, 2300 as described above, the light system 10 simultaneously produces a yellow light from the first light source 2200 and a white light from the second light source 2300. By positioning the first and second light sources 2200, 2300 within the same shroud 2110, and by curving the first light source 2200 around the second light source 2300, the heat generated by the second light source 2300 is absorbed by the first light source 2200. As previously explained, the absorbed heat aids the first light source 2200 in converting the solid metal particles (i.e., sodium for the present invention embodiment) into their vapor form, enabling the first light source 2200 to use less electricity to perform this conversion. In addition, the absorbed heat also aids the first light source 2200 in maintaining its operating temperature, which also enables the first light source 2200 to use less electricity when outputting light.

FIG. 4 further illustrates a coating 2150 on the surface of the shroud 2110. The coating 2150 may be disposed on either the inner surface of the shroud 2110 or the outer surface of the shroud 2110. The coating 2150 may be an infrared (IR) coating configured to reflect IR light waves back into the interior region 2140 of the shroud 10". Thus, the coating 2150 is configured to reflect and retain the heat that develops from the light sources 2200, 2300 within the interior region 2140 of shroud 2110. The coating 2150 not only provides insulation to the housing 2000, it also allows the visible light waves (approximately 400-700 nm) to travel out of the shroud 2110.

Figure 5:
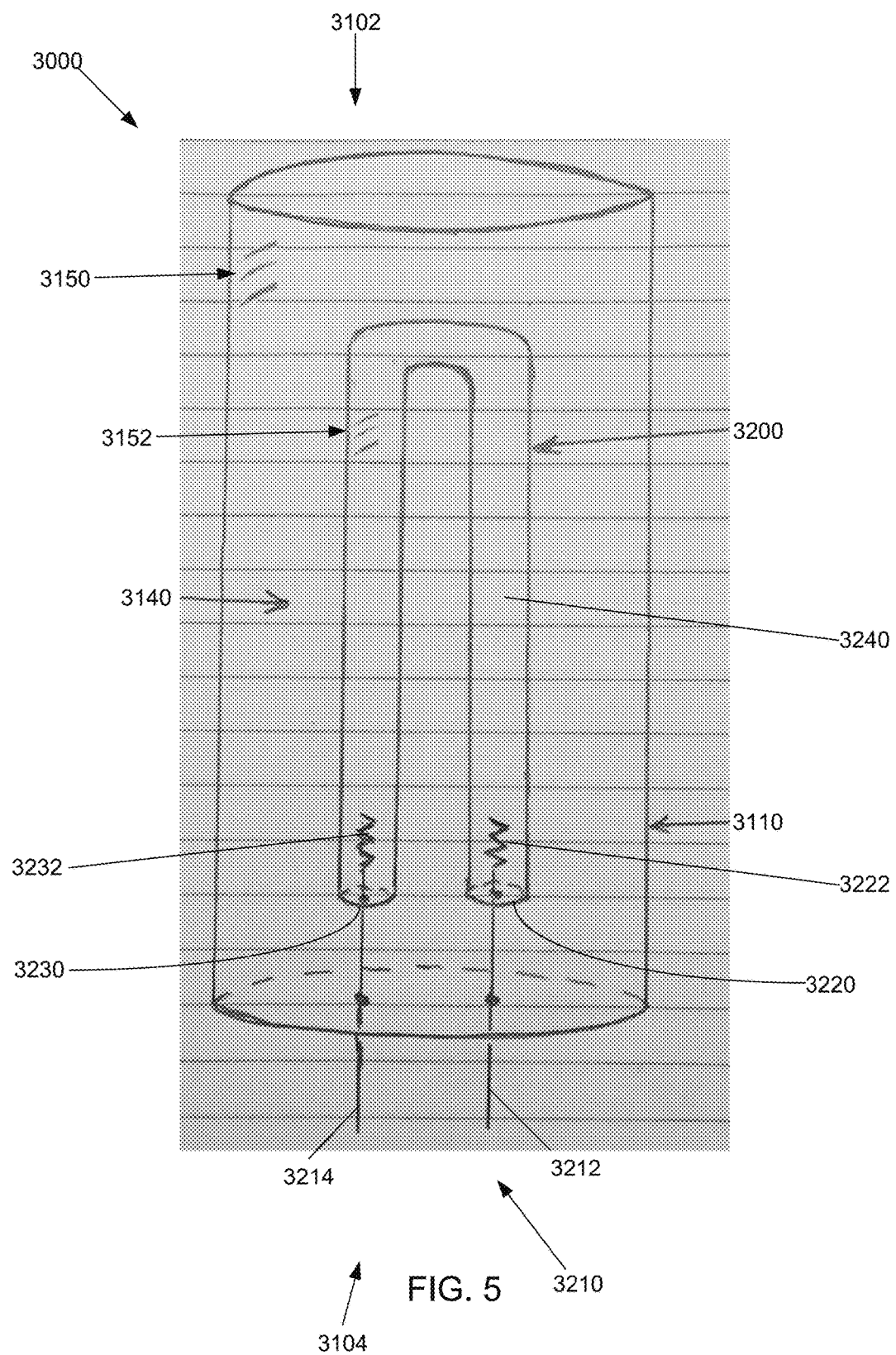
FIG. 5 illustrates a perspective view of a third embodiment of the housing of the embodiment of the outdoor light system illustrated in FIG. 1.

Turning to FIG. 5, illustrated is a detailed perspective view of a fourth embodiment of the housing 3000 of the light system 10. Similar to the other embodiments, the fourth embodiment of the housing 3000 includes a first end 3102 and a second end 3104 opposite the first end 3102. Similar to the third embodiment, the housing 3000 contains only one container or shroud 3110. The single shroud 3110 defines an interior region 3140 that houses a single light source 3200. While illustrated as substantially cylindrical, the shroud 3110 may be in any desired shape (e.g., rectangular, elliptical, spherical, etc.). However, cylindrical and elliptical shaped shrouds 3110 may enhance the radiation and heating effects within the interior region 3140 of the shroud 3110. The interior region 3140 of the shroud 110 may store or retain an inert or non-inert gas, or a mixture of gases. If the interior region 3140 of the shroud 110 retains a gas, the gas may be a noble gas (e.g., helium, neon, argon, krypton, xenon), a mixture of noble gases, or may contain no gas (i.e., a vacuum). Any stored gases may be retained within the interior region 3140 of the shroud 3110 at a pressure between 0 and 760 Torr. In the event the interior region 3140 contains a vacuum, the vacuum may be a high vacuum (i.e., pressure in the range from 100 millipascal (mPa) to 100 nanopascal (nPa)). The inert gases and the vacuum both serve to evenly distribute the heat generated within the interior region 3140 throughout the interior region 3140.

As illustrated in FIG. 5, the fourth embodiment of the housing 3000 includes a single light source 3200 disposed within the interior region 3140 defined by the single shroud 3120. The light source 3200 may be any type of gas-discharge lamp, including, but not limited to, a sodium-vapor type lamp that produces light with a yellow hue or color, or a metal-halide lamp that produces light with a white hue or color. The light source 3200 may be tubular with a first end 3220 and a second end 3230, and a tubular section 3240 extending in a substantially U-shape between the first end 3220 and the second end 3230. The first end 3220 of the light source 3200 may house a first filament 3222, while the second end 3230 may house a second filament 3232. While the light source 3200 is illustrated as being U-shaped, the light source 3200 may be of any shape within the interior region 3140 of the shroud 3110.

As further illustrated in FIG. 5, extending from the first and second ends 3220, 3230 are wires 3210. Wires 3210 include a first set of wires 3212 extending downwardly from the first end 3220 of the light source 3200 and a second set of wires 3214 extending downwardly from the second end 3230 of the light source 3200. The first and second sets of wires 3212, 3214 may extend through the second end 3104 of the housing 3000 and through connector 400 (illustrated in FIG. 1). The first set of wires 3212 may supply power to filaments 3222 in the first end 3220 of the light source 3200, while the second set of wires 3214 may supply power to filaments 3232 in the second end 3230 of the light source. The first and second sets of wires 3212, 3214 also support the light source 3200 within the interior region 3140 of the shroud 3110. When power is supplied to the filaments 3222, 3232, an electric arc is created between the two filaments 3222, 3232 through the tubular body of the light source 3200, and free electrons, accelerated by the electric arc in the tube, collide with the gas atoms to produce visible light.

As previously explained, when the light system 10 includes only light source 3200, the light system 10 may outputs only light produced by the single light source 3200, not multiple light sources like that of the first and third embodiments 100, 2000. By positioning the light source 3200 so that it curves around the interior region 3140, which is in a vacuum, the heat generated by the single light source 3200 is dispersed and retained within the interior region 3140 so that the heat may also be absorbed by the light source 3200. The absorbed heat aids the light source 3200 in converting the solid metal particles (i.e., sodium for a sodium-vapor lamp) into their vapor form, enabling the light source 3200 to use less electricity to perform this conversion when compared to the light source 3200 being disposed out of the interior region 3140. In addition, the absorbed heat also aids the light source 3200 in maintaining its operating temperature, which also enables the light source 3200 to use less electricity when outputting light.

Similar to the other embodiments, as illustrated in FIG. 5, a coating 3150 is disposed on the inner surface of the single shroud 3110. Unlike the other embodiments, however, a coating 3152 may also be disposed on the outer surface of the tube of the light source 3200. The coating 3150 may be disposed on any surface (inner or outer surface) of the single shroud 3110. Similarly, coating 3152 may be disposed on any surface (inner or outer surface) of the tube of the light source 3200. The coatings 3150, 3152 may be infrared (IR) coatings configured to reflect IR light waves back into either the interior region 3140 of the single shroud 3120 and/or the interior of the tube 3240 of the light source 3200. Thus, the coatings 3150, 3152 are configured to reflect and retain the heat that develops from the light source 3200 within the interior region 3140 of single shroud 1120 and/or within the tubular section 3240 of the light source 3200. Coating 3150 provides insulation to the housing 3000, while coating 3152 provides insulation to the tube 3240 of the single light source 3200. The coatings 3150, 3152 not only provide insulation, but they also allow the visible light waves (approximately 400-700 nm) to travel out of the tube and the shroud 3110.

Figure 6:
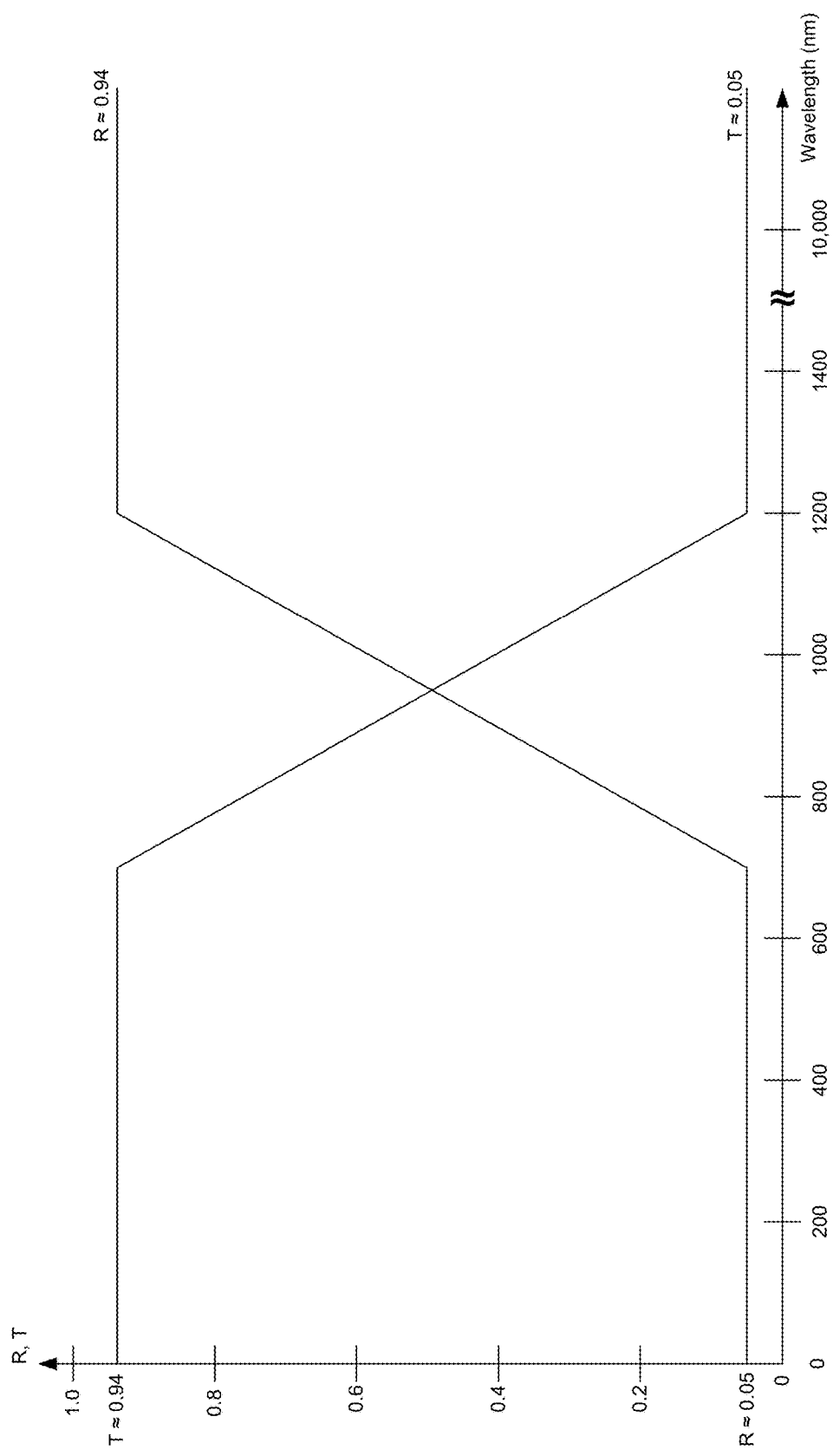
FIG. 6 illustrates a graphical chart illustrating the reflectance and transmittance properties of the coating of the embodiment of the outdoor light system illustrated in FIG. 1 for various light wavelengths.

Turning to FIG. 6, illustrated is a chart displaying the transmissivity and reflective properties of the coatings 150, 1150, 2150, 3150, 3152. For light waves less than 700 nanometers (nm), the coatings 150, 1150, 2150, 3150, 3152 have a transmittance T of approximately 94% and a reflectivity R of approximately 5%. Thus, for light waves that fall into this range of wavelength, the coatings 150, 1150, 2150, 3150 allow approximately 94% of the light through the shrouds 110, 1110, 2110, 3110 while reflecting only 5% of the light waves into the interior regions 140, 1140, 2140, 3140. Similarly, for wavelengths less than 700 nm, the coating 3152 allows approximately 94% of the light through the tubular section 3240 of the light source 3200 while reflecting only 5% of the light waves into the interior region of the tubular section 3240 of the light source 3200.

However, as the wavelengths of the light waves increase from approximately 700 nm to approximately 1200 nm, the reflectivity R properties of the coatings 150, 1150, 2150, 3150, 3152 also linearly increase from approximately 5%, for light waves around 700 nm, to approximately 94%, for light waves around 1200 nm. Conversely, as the wavelengths of the light waves increase from approximately 700 nm to approximately 1200 nm, the transmittance T properties of the coatings 150, 1150, 2150, 3150, 3152 decrease from approximately 94%, for light waves around 700 nm, to approximately 5%, for light waves around 1200 nm. In addition, for light waves having wavelengths greater than 1200 nm, the coatings 150, 1150, 2150, 3150, 3152 have a transmittance T of approximately 5% and a reflectivity R of approximately 94%. Thus, for light waves having wavelengths greater than 1200 nm, the coatings 150, 1150, 2150, 3150 allow only approximately 5% of the light waves through the shrouds 110, 1110, 2110, 3110 while reflecting approximately 94% of the light waves into the interior regions 140, 1140, 2140, 3140. Similarly, for light waves having wavelengths greater than 1200 nm, the coating 3152 allows only approximately 5% of the light through the tubular section 3240 of the light source 3200 while reflecting 94% of the light waves into the interior region of the tubular section 3240 of the light source 3200.

As displayed by the chart of FIG. 6, the coatings 150, 1150, 2150, 3150, 3152 enables light waves within the visible light spectrum (400 nm-700 nm) to travel out of the housings 100, 1000, 2000, 3000 while reflecting light waves greater than 1200 nm (IR light waves, microwaves, etc.) back into the interior regions 140, 1140, 2140, 3140 of the housings 100, 1000, 2000, 3000 or the interior region of the tubular section 3240 of the light source 3200.

For the first and second example embodiments of the housings 100, 1000, the combination of the coating 150, 1150, the vacuum between the outer shrouds 110, 1110 and the inner shrouds 120, 1120, and the vacuum or low pressure noble gas within the interior regions 140, 1140 of the inner shrouds 120, 1120 provides insulation to the housings 100, 1000. As explained previously, the vacuum between the outer and inner shrouds 110, 1110, 120, 1120 and the noble gas disposed within in the interior regions 140, 1140 of the inner shrouds 120, 1120 evenly disperses the heat produced by the light sources 200, 1200, 300 throughout the interior regions 140, 1140 of the inner shrouds 120, 1120. When the interior region 1140 of the inner shroud 1120 contains a vacuum instead of a noble gas, the vacuum also evenly disperses the heat produced by the light sources 1200 through the interior region 1140 of the inner shroud 1120.

The third example embodiment of the housing 2000, which only utilizes the combination of the coating 2150 and the vacuum or the low pressure noble gas within the interior region 2140 of the shroud 2110, may provide insulation that is approximately equivalent to that of housings 100, 1000. In addition, the fourth example embodiment of the housing 3000, which utilizes the combination of the coatings 3150 and 3152 and the vacuum or the low pressure noble gas within the interior region 3140 of the single shroud 3110, may provide insulation that is approximately equivalent to that of housings 100, 1000, 2000. Similar to the housings 100, 1000, the vacuum or noble gas disposed within the interior regions 2140, 3140 of the shroud 2110, 3110 evenly disperses the heat produced by the light sources 2200, 2300, 3200 throughout the interior regions 2140, 3140 of the shrouds 2110, 3110.

The addition of the reflective coatings 150, 1150, 2150, 3150 on the surface of the shrouds 110, 1110, 2110, 3110 aids in retaining the heat produced by the light sources 200, 300, 1200, 2200, 2300, 3200 within the housings 100, 1000, 2000, 3000 while still enabling the light waves of the visible light spectrum produced by the light sources 200, 300, 1200, 2200, 2300, 3200 to travel beyond the shrouds 110, 120, 1110, 1120, 2110, 3110. The combination of these elements enable the heat generated by the light sources 200, 300, 1200, 2200, 2300, 3200 to heat the interior regions 140, 1140, 2140, 3140 of the shrouds 120, 1120, 2110, 3110, respectively. Furthermore, reflective coating 3152 on the surface of the tubular section 3240 of the light source 3200 aids in retaining the heat produced by the light source 3200 within the interior region of the tubular section 3240 of the light source 3200 while still enabling the light waves of the visible light spectrum produced by the light source 3200 to travel beyond the tubular section 3240 of the light source 3200.

Increasing the temperature of the interior regions 140, 1140, 2140, 3140 of the shrouds 120, 1120, 2110, 3110, respectively, and the interior region of the tubular section 3240 of the light source 3200 allows the light sources 200, 1200, 2200, 3200 to utilize less electricity to vaporize the solid particles of the light sources 200, 1200, 2200, 3200 and to maintain a desired operating temperature. In addition, the increased temperature of the interior regions 140, 1140, 2140, 3140 and the interior region of the tubular section 3240 of the light source 3200 enables the light sources 200, 1200, 2200, 3200 to operate at a higher temperature, which may increase the amount of light output by the light sources 200, 1200, 2200, 3200. The coatings 150, 1150, 2150, 3150, 3152, the vacuum between the outer shrouds 110, 1110 and the inner shrouds 120, 1120, and the low pressure noble gas within the interior regions 140, 1140, 2140, 3140 of the shrouds 120, 1120, 2110, 3110, respectively, combine to provide a light system 10 that is more efficient than a single sodium-vapor lamp or metal-halide lamp. For example, the present invention embodiments described herein, which include a sodium-vapor lamp, may be capable of producing light (i.e., a mixture of yellow and white, yellow light, white light, etc.) at a luminous efficiency of approximately 300 lumens per watt. In addition, the combined yellow and white light output by the first and second light sources 200, 2200, 300, 2300 of the first and third invention embodiments described herein provides a better color rendering than only a monochromatic yellow light produced from a conventional sodium-vapor lamp.

It is also to be understood that the light system of the present invention, or portions thereof may be fabricated from any suitable material or combination of materials, such as glass, plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. An apparatus comprising:
a first housing having a first cavity, a first interior surface, and a first exterior surface;
a second housing having a second cavity, a second interior surface, and a second exterior surface, the second cavity being smaller than the first cavity and the second housing disposed within the first cavity;
a first light source disposed within the second cavity, the first light source being electrically powered; and
a reflective coating disposed on at least one of the surfaces of the first housing or second housing.

2. The apparatus of claim 1, further comprising:
a second light source disposed within the second cavity.

3. The apparatus of claim 2, wherein the first light source is a sodium-vapor type light source.

4. The apparatus of claim 3, wherein the second light source is a metal-halide type light source.

5. The apparatus of claim 1, wherein the reflective coating is disposed on the first interior surface of the first housing.

6. The apparatus of claim 1, wherein the second cavity contains at least one gas.

7. The apparatus of claim 1, wherein the reflective coating is an infrared (IR) reflective coating configured to reflect IR radiation.

8. The apparatus of claim 7, wherein the IR reflective coating transmits 94% of light waves that are less than or equal to 700 nanometers.

9. The apparatus of claim 8, wherein the IR reflective coating reflects 94% of light waves that are greater than or equal to 1200 nanometers.

10. An apparatus comprising:
a housing having a cavity, an interior surface, and an exterior surface;
a first light source disposed within the cavity;
a second light source disposed within the cavity; and
a reflective coating disposed on at least one of the surfaces of the housing, wherein at least one of the first light source or the second light source is electrically powered.

11. The apparatus of claim 10, wherein the first light source is a sodium-vapor type light source.

12. The apparatus of claim 11, wherein the second light source is a metal-halide type light source.

13. The apparatus of claim 10, wherein the reflective coating is an infrared (IR) reflective coating configured to reflect IR radiation.

14. The apparatus of claim 10, wherein the reflective coating is disposed on the interior surface of the housing.

15. An apparatus comprising:
a housing having a cavity, an interior surface, and an exterior surface;
at least one light source disposed within the cavity, the at least one light source having an interior surface and an exterior surface; and
a reflective coating disposed on at least one of the surfaces of the housing and at least one of the surfaces of the at least one light source.

16. The apparatus of claim 15, wherein the reflective coating is an IR reflective coating.

17. The apparatus of claim 15, wherein the reflective coating is disposed on the interior surface of the housing and the interior surface of the at least one light source.

18. The apparatus of claim 15, wherein the reflective coating is disposed on the exterior surface of the housing and the interior surface of the at least one light source.

19. The apparatus of claim 15, wherein the reflective coating is disposed on the exterior surface of the housing and the exterior surface of the at least one light source.

20. The apparatus of claim 15, wherein the reflective coating is disposed on the interior surface of the housing and the exterior surface of the at least one light source.

* * * * *